United States Patent
Stevens et al.

(10) Patent No.: US 11,622,297 B2
(45) Date of Patent: Apr. 4, 2023

(54) SYSTEM AND METHOD FOR DYNAMIC VARIABLE COMPRESSION OF AIRCRAFT COMMUNICATIONS, ADDRESSING, AND REPORTING SYSTEM (ACARS) PROTOCOL MESSAGING

(71) Applicant: Rockwell Collins, Inc., Cedar Rapids, IA (US)

(72) Inventors: James A. Stevens, Lucas, TX (US); Alain J. M. Bothorel, Balma (FR)

(73) Assignee: Rockwell Collins, Inc., Cedar Rapids, IA (US)

( * ) Notice: Subject to any disclaimer, the term of this patent is extended or adjusted under 35 U.S.C. 154(b) by 101 days.

(21) Appl. No.: 17/035,994

(22) Filed: Sep. 29, 2020

(65) Prior Publication Data

US 2022/0070728 A1   Mar. 3, 2022

(30) Foreign Application Priority Data

Sep. 3, 2020 (FR) ....................... 2008888

(51) Int. Cl.
*H04W 28/06* (2009.01)
*H04B 7/185* (2006.01)
(Continued)

(52) U.S. Cl.
CPC ........ *H04W 28/06* (2013.01); *H04B 7/18506* (2013.01); *H04L 1/1812* (2013.01); *H04L 69/04* (2013.01)

(58) Field of Classification Search
CPC .. H04W 28/06; H04B 7/18506; H04L 1/1812; H04L 69/04
(Continued)

(56) References Cited

U.S. PATENT DOCUMENTS 6,937,652 B2   8/2005   Gold
7,327,293 B2   2/2008   Foster
(Continued)

FOREIGN PATENT DOCUMENTS

CA   2578856 A1 *   3/2006   .............. H03M 7/30
CN   110635837 A    12/2019
(Continued)

OTHER PUBLICATIONS

Extended Search Report in European Application No. 21194757.7 dated Jan. 27, 2022, 10 pages.
(Continued)

*Primary Examiner* — Intekhaab A Siddiquee
(74) *Attorney, Agent, or Firm* — Suiter Swantz pc llo

(57) ABSTRACT

An Aircraft Communication and Addressing Reporting System (ACARS) compatible transmitter is disclosed. In embodiments, the transmitter receives outbound (e.g., downlink or uplink) ACARS messages from aircraft end systems and compresses the header/trailer (H/T) component and/or text payloads of ACARS blocks (e.g., text messages) or ACARS acknowledgements (ACK)) prior to transmission. For example, the transmitter compresses ACARS blocks by removing fixed markers and encoding variable fields. The transmitter parses incoming text payloads to determine their character distribution and selects a radix alphabet including the ASCII characters used in the text payload. The transmitter converts the ASCII characters to binary characters of the corresponding alphabet based on the selected radix base, assembling a compressed message block for transmission based on the compressed H/T component and/or text payload, adding a link layer header to indicate the selected radix base to the ACARS destination for decompression of the received compressed message.

15 Claims, 7 Drawing Sheets

(51) Int. Cl.
 *H04L 1/18* (2006.01)
 *H04L 69/04* (2022.01)
 *H04L 1/1812* (2023.01)

(58) Field of Classification Search
 USPC .......................................................... 370/230
 See application file for complete search history.

(56) References Cited

U.S. PATENT DOCUMENTS

| | | | |
|---|---|---|---|
| 7,696,920 | B1 | 4/2010 | Finley et al. |
| 9,019,822 | B2 | 4/2015 | Asterjadhi et al. |
| 9,019,960 | B2 | 4/2015 | Cheriyath et al. |
| 9,596,289 | B2 | 3/2017 | Bolling |
| 2003/0030581 | A1* | 2/2003 | Roy ............... H04L 9/3268 342/36 |
| 2010/0074253 | A1* | 3/2010 | Cheriyath ......... H04B 7/18506 370/389 |
| 2016/0191075 | A1* | 6/2016 | Branscome ......... H03M 7/3066 341/67 |
| 2018/0227239 | A1 | 8/2018 | Srinivasan et al. |

FOREIGN PATENT DOCUMENTS

| | | | |
|---|---|---|---|
| EP | 2166677 | A2 | 3/2010 |
| EP | 3018835 | A1 * | 5/2016 ............. H03M 7/30 |
| EP | 3358804 | A1 | 8/2018 |
| FR | 3046894 | B1 | 3/2020 |
| JP | 4987912 | B2 | 8/2012 |
| WO | 2008117164 | A4 | 3/2009 |

OTHER PUBLICATIONS

Baker, Robert, "Don't Waste Memory Space", Byte Magazine, 1 (16) p. 58-59, Dec. 1, 1976.

Roy, Aloke, "Secure Aircraft Communications Addressing and Reporting System (ACARS)", IEEE Xplore, 2001, 11 pages.

Signore, T.L. et al., "The Aeronautical Telecommunication Network (ATN)", IEEE Xplore, 1998, pp. 40-44.

Sun, Shuguang, "ACARS Data Identification and Application in Aircraft Maintenance", IEEE Computer Society, First International Workshop on Database Technology and Applications, 2009, 5 pages.

Yue, Meng et al., "The Approach of ACARS Data Encryption and Authentication", IEEE Computer Society, International Conference on Computational Intelligence and Security, 2010, pp. 556-560.

* cited by examiner

602 — Receiving at least one outbound ACARS compatible message from an end system of an ACARS source, the outbound ACARS compatible message including one or more of a header/trailer (H/T) component and a text payload comprising a plurality of component characters 604 — Determining if the ACARS compatible message is an acknowledgement (ACK) or an ACARS block 606 — Generating at least one compressed H/T component based on the H/T component by
1) removing one or more fixed markers of the H/T component;
and
2) encoding one or more variable fields of the H/T compoinent

608 — Generating at least one compressed text payload based on the text payload by:
1) selecting a radix base R by analyzing the component characters of the text payload, where R is an integer; and
2) mapping the plurality of component characters to an alphabet of R compressed characters 610 — Assembling a compressed message block based on the compressed H/T, the compressed text payload, and a link layer header corresponding to the radix base R 612 — Transmitting the compressed message block to one or more ACARS destinations according to at least one ACARS compatible datalink protocol

SYSTEM AND METHOD FOR DYNAMIC VARIABLE COMPRESSION OF AIRCRAFT COMMUNICATIONS, ADDRESSING, AND REPORTING SYSTEM (ACARS) PROTOCOL MESSAGING

CROSS-REFERENCE TO RELATED APPLICATIONS

The instant application claims priority under 35 U.S.C § 119 to French provisional patent application No. 2008888 entitled SYSTEM AND METHOD FOR DYNAMIC VARIABLE COMPRESSION OF AIRCRAFT COMMUNICATIONS, ADDRESSING, AND REPORTING SYSTEM (ACARS) PROTOCOL MESSAGING, filed Sep. 3, 2020. Said patent application No. 2008888 is herein incorporated by reference in its entirety.

TECHNICAL FIELD

The subject matter disclosed by the instant application is directed generally to aircraft communications and more particularly to Aircraft Communications, Addressing, and Reporting System (ACARS) compatible messaging.

BACKGROUND

Aircraft Communication Addressing and Reporting System (ACARS) is a datalink system providing for high-frequency data communications between aircraft systems and ground control facilities. For example, the ACARS system includes aircraft line replaceable units (LRU) for transmitting messages from aircraft components or end systems to the ground via data radios operating in the aircraft band (30-300 MHz) or via satellite-based communications (satcom). While the information conveyable via ACARS messages includes status updates from a variety of different components, the ACARS messaging format is standardized (see, e.g., ARINC specification 618-7). However, a significant portion of the message structure includes fixed elements that occupy bandwidth even though they vary only slightly, if at all, with respect to multiple messages transmitted by a common source aircraft.

SUMMARY

An Aircraft Communication and Addressing Reporting System (ACARS) compatible transmitter is disclosed. In embodiments, the transmitter includes a compressor in communication with aircraft-based (or ground-based) ACARS end systems. The compressor receives outbound ACARS compatible messages from the end systems, the messages configured for transmission to ground stations or other ACARS destinations. The compressor determines if the outbound message is an ACARS block (e.g., a text message including a text payload as well as a header/trailer (H/T) component) or an acknowledgement (ACK) (e.g., general response, which may or may not include a text payload). A compressed message block is assembled (whether the message is a text message or an ACK) by removing fixed markers and binary encoding variable fields from the ACK or from the H/T component. The compressed message block is then transmitted based on the appropriate ACARS datalink protocol.

In some embodiments, the fixed markers include an address field indicating the ACARS source. For example, compressing the H/T component includes mapping the address field to a radio address of the ACARS transceiver or performing a radix-base compression of the address field.

In some embodiments, if the ACARS message is a text message, the text payload is also compressed. For example, based on the component characters of the text payload the compressor module selects a radix base R (e.g., where R is an integer less than 128, or the number of possible 7-bit ASCII characters) and maps the component characters to a reduced alphabet of R binary radix characters. The compressed message block (or blocks, depending on the size of the message) is assembled based on the compressed H/T component, the compressed text payload, and a link layer header indicating the radix base, and transmitted based on the appropriate ACARS datalink protocol.

In some embodiments, the radix base R is 128.
In some embodiments, the radix base R is 40.
In some embodiments, the radix base R is 45.
In some embodiments, the radix base R is 96.

An ACARS compatible transmitter configured for compression of both H/T and text payloads of outbound text messages is also disclosed. In embodiments, the transmitter includes a compressor module in communication with aircraft-based ACARS end systems, which receives outbound ACARS compatible messages from the end systems. The compressor module determines if the outbound message is an ACARS text message (e.g., including a text payload as well as a header/trailer (H/T) component) or an outbound acknowledgement (ACK) (e.g., general response). If the outbound ACARS message is an ACK, the compressed ACARS block is generated by removing fixed markers from, and binary encoding variable fields of, the ACK message format. If the ACARS message is an ACARS text message, the H/T is compressed by removing fixed markers from, and binary encoding variable fields of, the ACK message format. The compressor module compresses the text payload by selecting a radix base R (e.g., where R is an integer not more than 128, or the number of possible 7-bit ASCII characters) and mapping the component characters to a reduced alphabet of R binary radix characters. The compressed message block (or blocks, depending on the size of the message) is assembled from the compressed H/T, the compressed text payload, and a link layer header indicating the radix base, and transmitted based on the appropriate ACARS datalink protocol.

In some embodiments, the radix base R is 128.
In some embodiments, the radix base R is 40.
In some embodiments, the radix base R is 45.
In some embodiments, the radix base R is 96.

In some embodiments, if the ACARS message is an ACK, the ACK is compressed by 1) removing one or more fixed markers of the ACK and 2) binary encoding one or more variable fields of the ACK. The compressed ACK is transmitted according to the appropriate ACARS datalink protocol.

In some embodiments, the fixed markers include an address field indicating the ACARS source. For example, compressing the H/T component includes mapping the address field to a radio address of the ACARS transceiver or performing a radix-base compression of the address field.

A method for dynamic compression of Aircraft Communication and Addressing Reporting System (ACARS) compatible messages is also disclosed. In embodiments, the method includes receiving outbound ACARS compatible messages from an ACARS end system or source. The method includes determining whether the outbound messages are acknowledgements (ACK) (e.g., general responses) or text messages including a header/trailer (H/T)

component as well as a text payload. The method includes, if the message is a text message, compressing the H/T by removing one or more fixed markers and binary encoding one or more variable fields. The method includes compressing the text payload by selecting a radix base R based on the component characters of the text payload (e.g., where R is an integer not more than 128, or the number of possible 7-bit ASCII characters) and mapping the component characters of the text payload to an alphabet of R binary radix characters. The method includes assembling a compressed ACARS block (e.g., message block) based on the compressed H/T, the compressed text payload, and a link layer header indicating the radix base R.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 5 is a table of example radix bases and alphabets for text payload compression used by the ACARS implementation of FIG. 1;

and FIGS. 6A and 6B are process flow diagrams illustrating a method for dynamic compression of ACARS messages in accordance with example embodiments of this disclosure.

DETAILED DESCRIPTION

Figure 1:
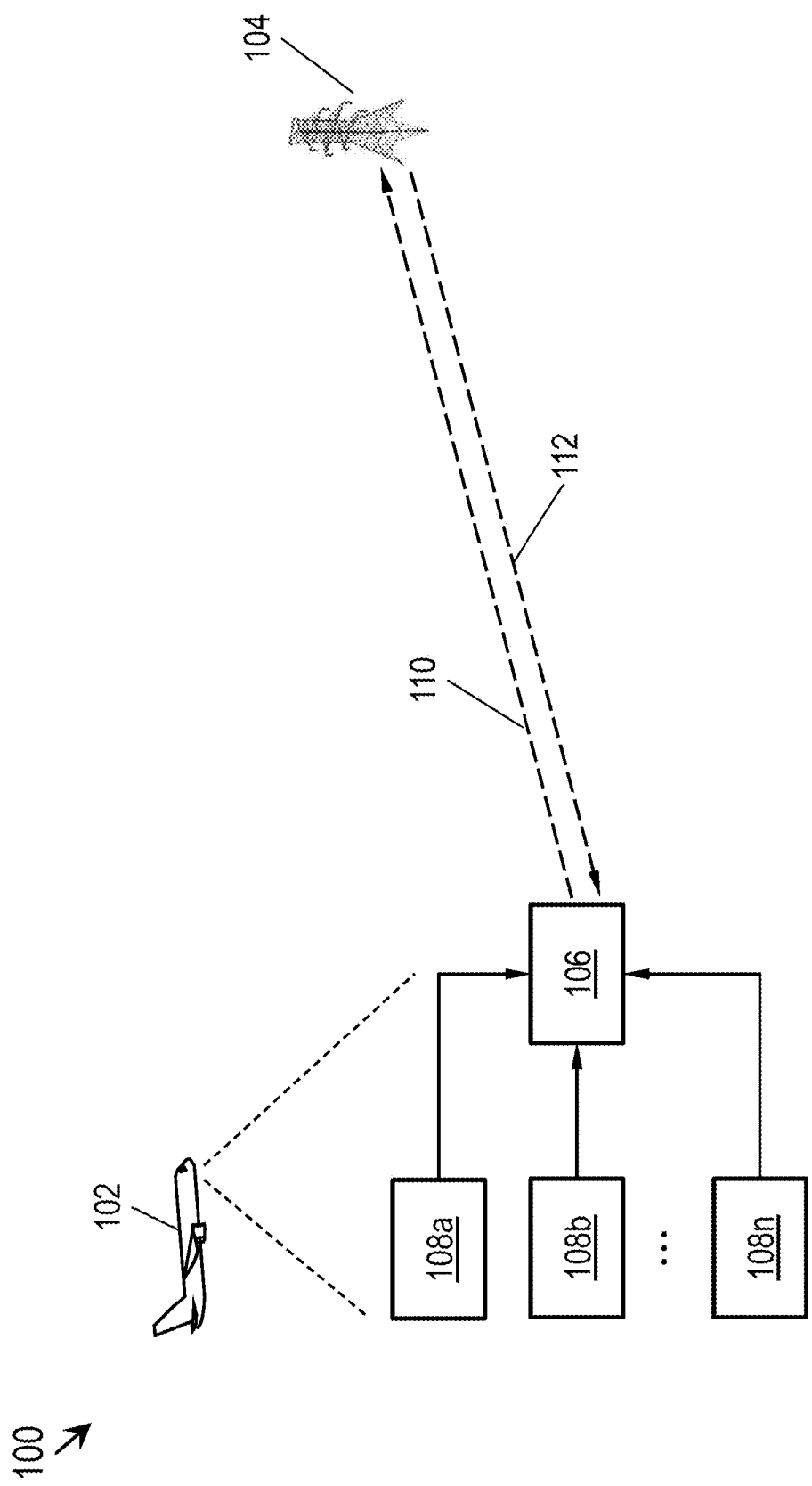
FIG. 1 is a diagrammatic illustration of an Aircraft Communication and Addressing Reporting System (ACARS) implementation according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, a system and method for dynamic compression of ACARS messages is disclosed. By compressing message content, a given ACARS system including an aircraft and its associated ground station can transmit more messages (e.g., uplink and downlink); similarly, a greater number of aircraft may be supported by a given ground station (e.g., given a consistent average number of ACARS messages per each aircraft in its operating space. Similarly, ACARS message compression and bandwidth savings are more cost-effective for airline customers who may be charged on a volume basis (e.g., per byte) by a service provider. The compression system streamlines ACARS header/trailer (H/T) components and text payloads in different ways. For example, fixed or constant fields are removed from the H/T components (or, similarly, from ACARS acknowledgement (ACK) messages) and variable fields encoded into more compact formats. With respect to the text payload, the system dynamically parses the textual content and choose a radix compression method via which the text is compressed, indicating the selected radix compression for use by the receiver in decoding the compressed message.

Referring to FIG. 1, an Aircraft Communication and Addressing Reporting System (ACARS) system 100 is disclosed. The ACARS system 100 may include an aircraft 102 and proximate ground station 104.

In embodiments, the aircraft 102 may be an ACARS source transmitting messages to an ACARS destination, e.g., the ground station 104. For example, the ground station 104 may be a ground control facility managing the operational space through which the aircraft 102 is currently traveling. For example, the source side of the ACARS system 100 may include a transceiver 106 incorporating one or more processors in communication with a variety of end systems 108a, 108b, . . . 108n throughout the aircraft 102. In some embodiments, the ground station 104 may be similarly in communication with ground-based end systems (not shown). In embodiments, uplink or ground-to-air ACARS messaging (e.g., from the ground station 104 to the aircraft 102) may similarly be handled by the ACARS system 100 as disclosed below.

In embodiments, the transceiver 106 may receive ACARS messages (e.g., fuel levels, component status updates, failure warnings, airline text messages) from the end systems 108a-n for downlink transmittal (110) to the ground station 104. In some embodiments, the transceiver 106 may also receive ground-to-air ACARS messages (112) transmitted by the ground station 104. For example, downlink ACARS messages may be transmitted via a variety of digital datalink protocols, e.g., High Frequency Data Link (HFDL), VHF Data Link (VDL), satellite-based digital communications protocols (SATCOM). ACARS over IP (AoIP), or ACARS messaging via TCP/IP and cellular networks.

Figure 2:
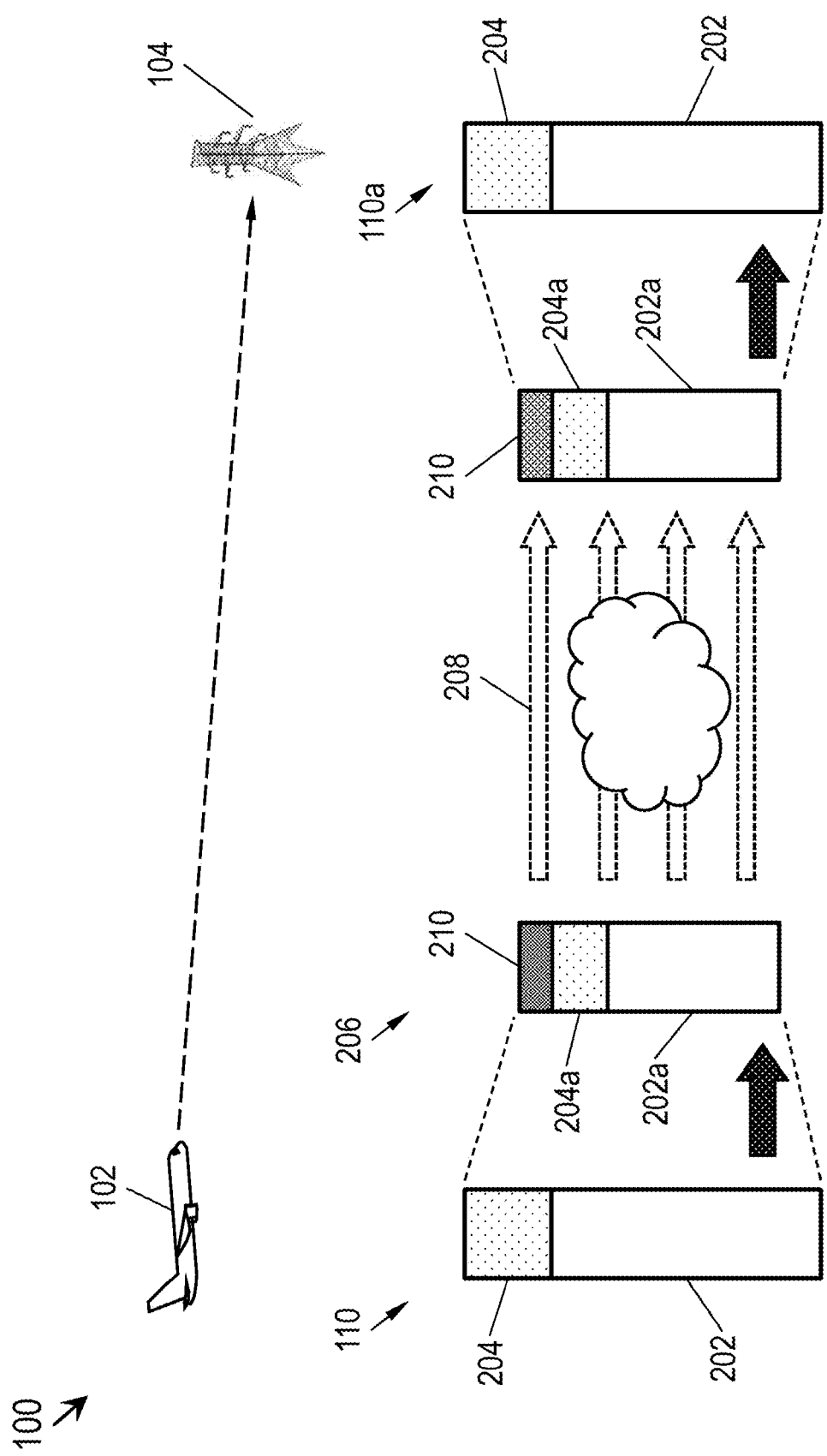
FIG. 2 is a diagrammatic illustration of ACARS compression operations of the ACARS implementation of FIG. 1.

In embodiment, referring also to FIG. 2, the transceiver 106 aboard the aircraft 102 may encode outbound ACARS text messages 110 including a text payload 202 and header/trailer (H/T) component 204. For example, the transceiver 106 may initially determine whether an outbound ACARS text message 110 is an ACARS block (e.g., a text message including a text payload 202 and H/T component 204) or an ACARS acknowledgement (ACK) (e.g., general response), which may or may not include a text payload 202 but includes similar, but differently formatted, fields to the H/T component 204 (see, e.g., FIG. 4 below).

the text payload 202 may correspond to the actual text of a given ACARS text message 110 (e.g., restricted to non-control characters of the ISO/IEC 8859-5 ("ISO-5") set of Latin/Cyrillic ASCII characters) while the H/T component 204 includes various identifiers, sequences, labels, and/or suffixes which may remain fixed or constant among messages transmitted by a given source.

In embodiments, the transceiver 106 may include a compressor module configured for dynamic compression of the H/T component 204 and text payload 202 into one or more compressed message blocks 206 (e.g., ARINC 618 blocks). For example, if the ACARS text message 110 is smaller than the maximum payload size of the underlying digital datalink 208, the ACARS text message may be formatted into a single block; larger messages may be formatted into multiple blocks. The resulting compressed message block 206 may include a compressed header 204a based on the H/T component 204, a compressed text payload 202a based on the text payload 202, and a link-layer header 210 inserted by the transceiver 106 and indicating the means via which the text payload 202 was compressed (as shown below). When the compressed message block 206 is transmitted across the digital datalink 208 to the ground station 104 (e.g., via a variety of digital communications protocols), the ACARS end system at the ground station may decode the compressed message according to the compression method indicated by the link layer header 210, resulting in a decoded ACARS text message 110a incorporating the text payload 202 and H/T component 204 of the original ACARS text message 110.

Figure 3:
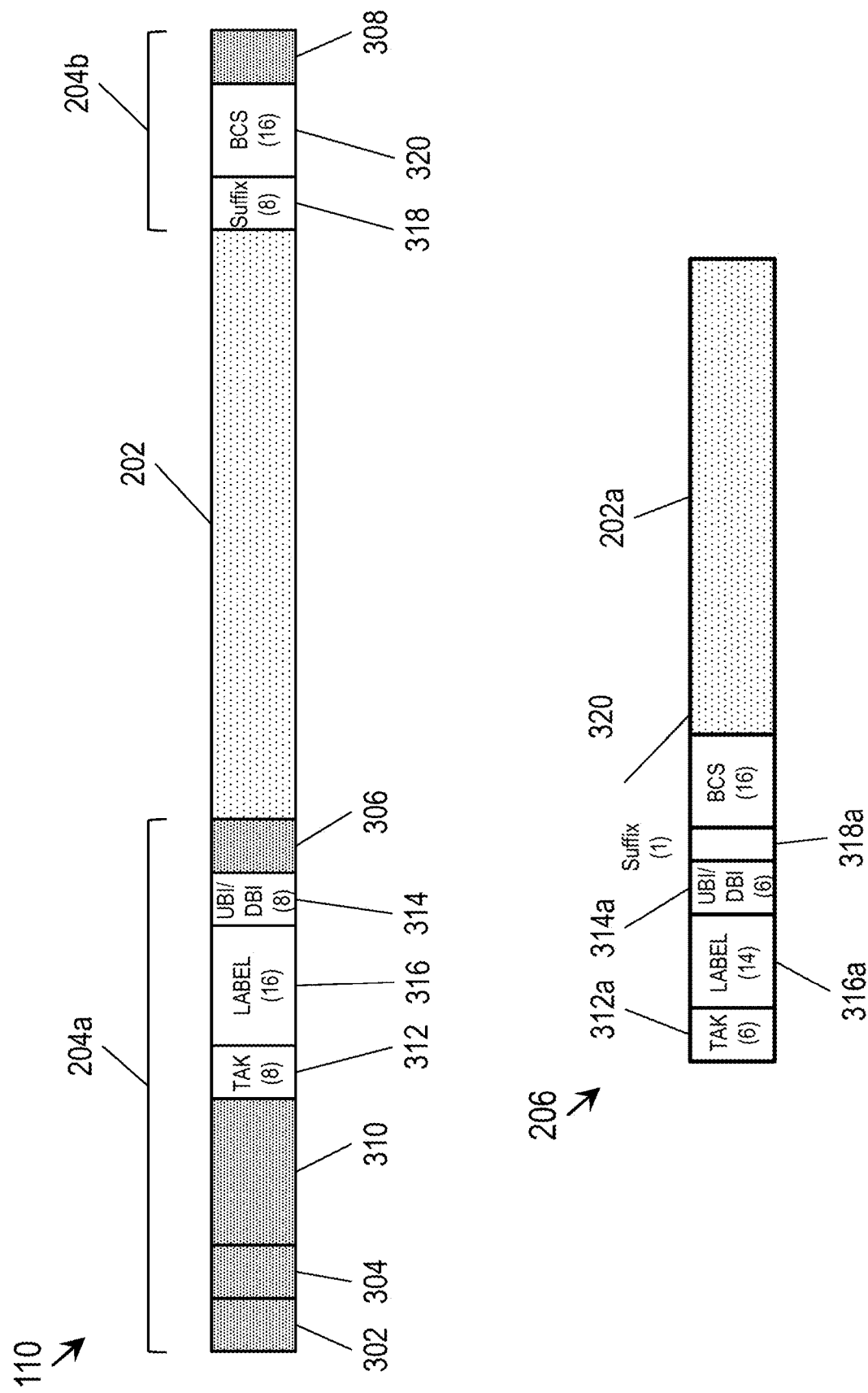
FIG. 3 is a diagrammatic illustration of header/trailer (H/T) component compression operations of the ACARS implementation of FIG. 1.

Referring now to FIG. 3, the ACARS text message 110 and compressed message block 206 are disclosed. The H/T component 204 of the ACARS text message 110 may include header components 204a and trailer components 204b.

In embodiments, the ACARS system (100, FIG. 1) after differentiating the ACARS text message 110 from an ACARS acknowledgement (see FIG. 4 below), may compress the H/T component 204 via the removal of fixed markers and the binary encoding of variable fields. For example, fixed markers may remain constant among some or all messages transmitted by the ACARS system 100 and may include, e.g., start of header (SOH) character 302; mode characters 304; end-of preamble control character 306 (STX); and DEL character 308 for indicating the end of ACARS text message 110.

In embodiments, the ACARS system 100 may remove all fixed markers 302, 304, 306, 308 with the exception of the address field 310. For example, the address field 310 may be a 7-character field corresponding to a registration number identifying the transmitting aircraft (102, FIG. 1) or for aircraft registered within the United States, an N-number (e.g., N111ZZ, where each 1 may be a numerical digit and each Z a letter of the alphabet). In embodiments, the address field 310 may be removed and the identifying address mapped to an identifying address of the transceiver (106, FIG. 1), e.g., a High Frequency Network (HFN) ID, or to the link layer address in the link layer header (210, FIG. 2). In some embodiments, the transceiver 106 may perform radix base compression of the address field 310, compressing the 56-bit address field (e.g., seven 8-bit characters) via radix base 38 compression, resulting in a 37-bit compressed address.

In embodiments, the ACARS system 100 may compress variable fields within the header components 204a and trailer components 204b via binary encoding. For example, the positive technical acknowledgement (TAK) character 312, which may be any of A-Z, a-z, or NAK (e.g., 53 possible values), may be reduced from 8 bits to 6 bits (312a; e.g., $2^6$ or 64 possible values). Similarly, the uplink/downlink block identifier 314 (UBI/DBI), which may be A-Z, a-z, NUL, or 0-9 (e.g., 63 possible values), may be reduced from 8 bits to 6 bits (314a). The label field 316, including two hexadecimal characters 00-7F, may be reduced from 16 bits to 14 bits (316a; e.g., $2^7$ or 128 possible values per character). The terminal block suffix 318 may be reduced from 6 bits to a single bit (318a; e.g., indicating end of block (ETB) or end of terminal block (ETX)). In this way, the variable fields (312, 314, 316, 318) of the H/T component 204 may be reduced in size to 5.375 bytes (27 bits), or 30% of its original size. In some embodiments, the terminal block suffix 318 may be compressed to 2 bits rather than a single bit (e.g., if the downlink ACARS text message 110 is to be transmitted via VHF Data Link (VDL) or selected other datalink protocols). Accordingly, the 18-byte H/T component 204 (e.g., header components 204a, trailer components 204b) may be compressed by 70% into a 5.375-byte compressed message block 206 (excluding the text payload 202; e.g., the reduced TAK character 312a, reduced UBI/DBI 314a, reduced label field 316a, and BCS field 320).

In embodiments, the 16-bit binary checksum field 320 (BCS) may be retained intact. In some embodiments, the BCS field 320 may also be removed. For example, if lower-layer checksum and compression implementations are sufficiently robust, the BCS field 320 may be removed and recalculated on the receiver side at the ground station (104, FIG. 1).

Figure 4:
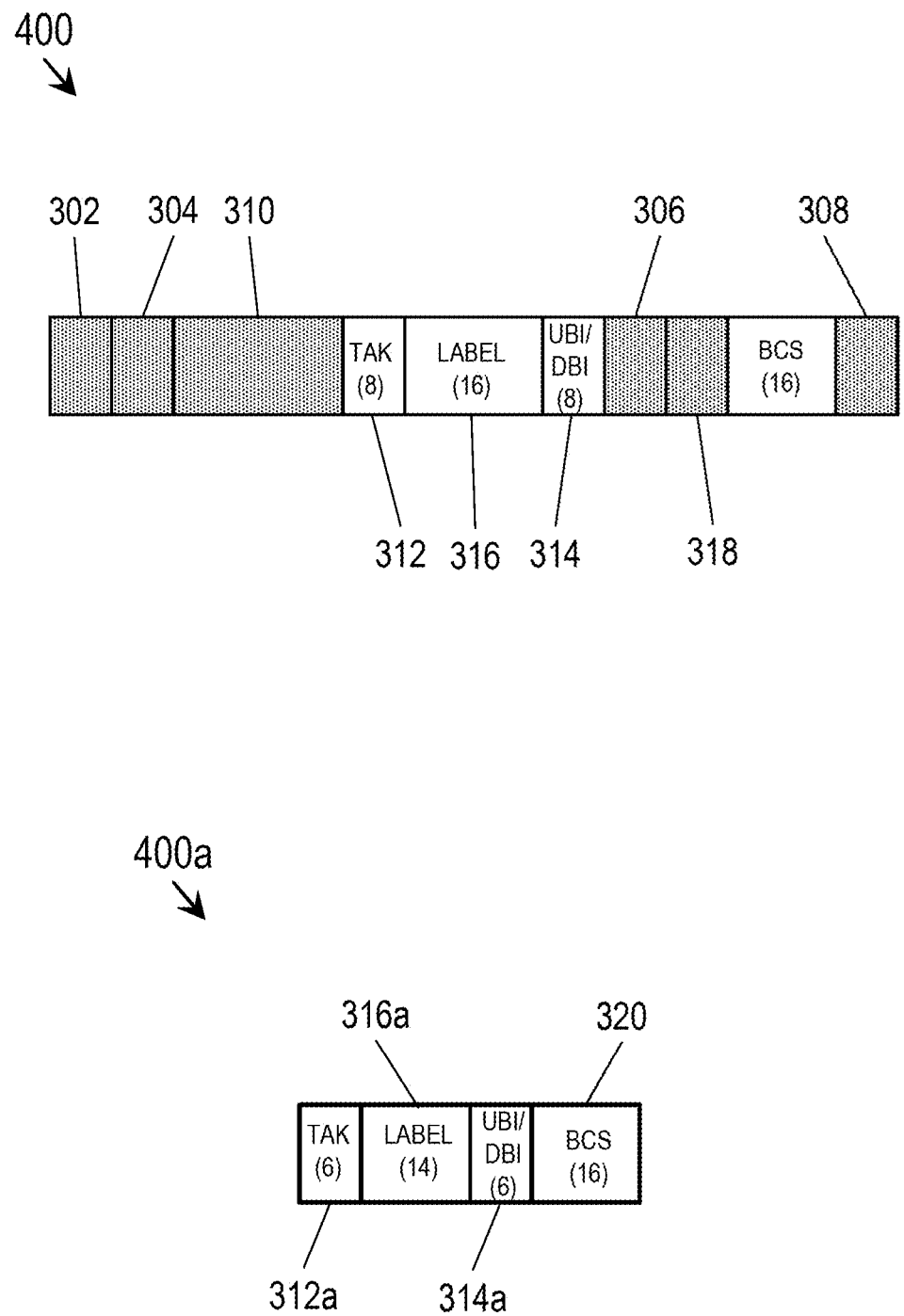
FIG. 4 is a diagrammatic illustration of acknowledgement (ACK) compression operations of the ACARS implementation of FIG. 1.

Referring also to FIG. 4, the ACARS acknowledgement 400 (ACK; e.g., general response) may be implemented and may operate similarly to the ACARS text message 110 of FIG. 3, except that the ACARS ACK 400 may not include the text payload 202. The ACK 400 may incorporate one or more of, e.g., the SOH character 302; mode characters 304; STX 306; DEL character 308; address field 310; TAK character 312; UBI/DBI 314; label field 316; terminal block suffix 318 (e.g., always ETX) and BCS field 320 (for example, similar to the header components 204*a* and trailer components 204*b* of FIG. 3, but not necessarily separated into header and trailer components, e.g. if there is no text payload 202).

In embodiments, the ground station 104 may send an uplink ACARS ACK 400 in acknowledgement of its response of a downlink ACARS text message 110. For example, the ACARS ACK 400 (e.g., without text payload 202) may comprise 17 characters. Text payloads 202 in the ACARS ACK 400 may be handled as described above with respect to the ACARS text message 110. In embodiments, the fixed markers (SOH character 302, mode characters 304, address field 310, DEL 308) of the ACARS ACK 400 may be treated as described above with respect to the ACARS text message 110, with the addition of the terminal block suffix 318 (which is always ETX and therefore may also be removed). Accordingly, the 17-byte ACARS ACK 400 may be compressed by 69% into a 5.25-byte compressed ACK 400*a* (e.g., the reduced TAK character 312*a*, reduced UBI/DBI 314*a*, reduced label field 316*a*, and BCS field 320).

Referring back to FIG. 3, the ACARS system (100, FIG. 1) may further compress the downlink ACARS text message 110 through dynamic compression of the text payload 202. For example, the text payload 202 may comprise up to 220 non-control ISO-5 characters (7-bit ASCII plus one parity bit; some examples, e.g., satcom/Category B (as indicated by the mode characters (304, FIG. 3)), may include up to 3,520 characters).

In embodiments, the ACARS system 100 may generate a compressed text payload (202*a*, FIG. 2) via dynamic compression of the text payload 202 subsequent to determining that a downlink ACARS text message 110 received from the end systems (108*a-n*, FIG. 1) is actually a downlink ACARS block including a text payload (rather than, e.g., an ACARS ACK (400, FIG. 4)) and subsequent to compression of the H/T component (204*a-b*, FIG. 3) as described above. For example, the transceiver (106, FIG. 1) may parse the text payload 202 of an incoming ACARS text message 110 to determine which characters are used in the message.

Figure 5:
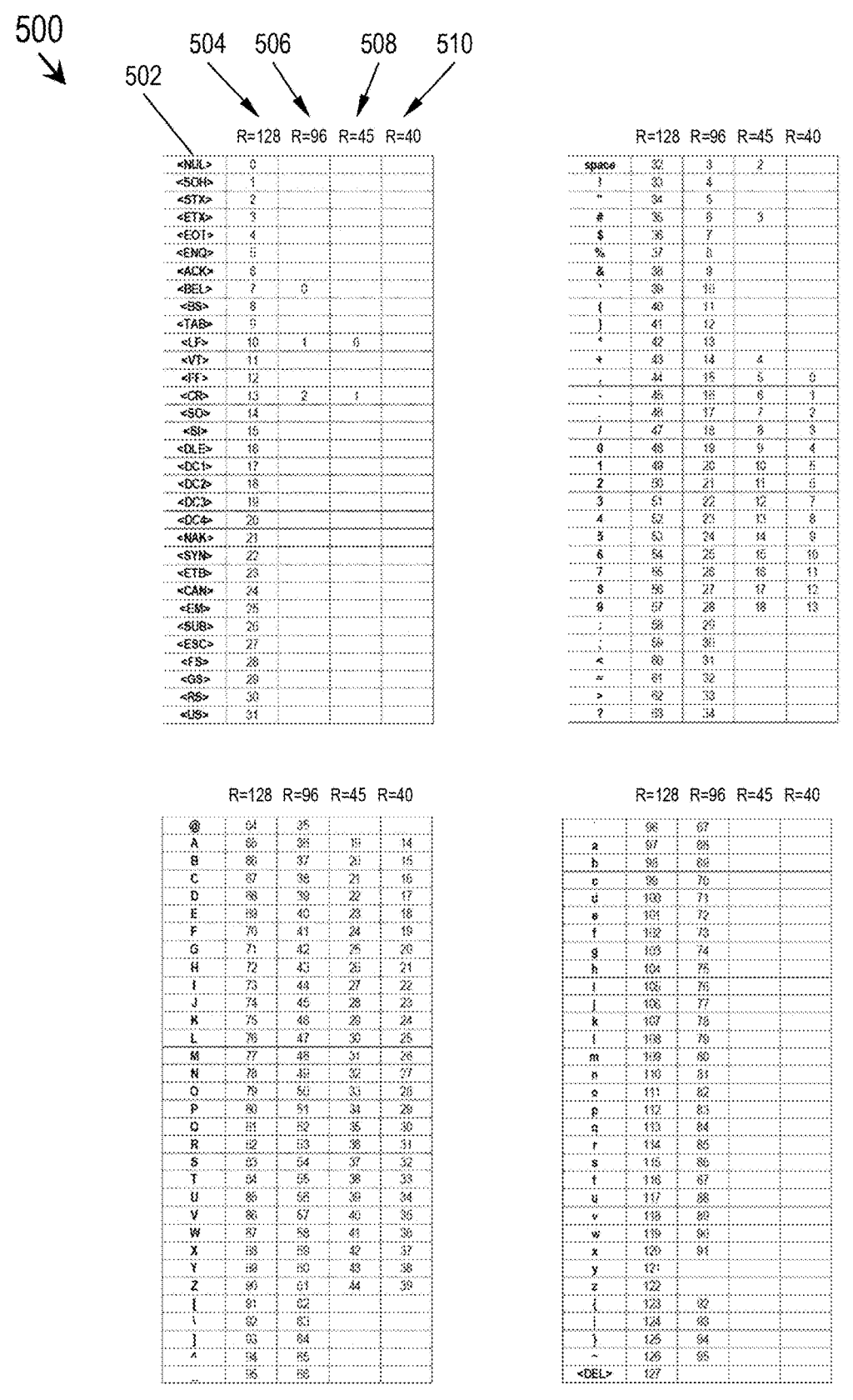

In embodiments, based on the character set in use within the text payload 202, the transceiver 106 may select from several alphabets of radix compressed characters capable of accommodating the character set in use, converting the ASCII characters of the text payload (or groups of ASCII characters) to radix character values of the selected alphabet. Referring also to FIG. 5, the table 500 is disclosed. For example, each 8-bit ASCII character of the text payload (202, FIG. 3) may have $256 = 2^8$ possible values (502), or $128 = 2^7$ and an ACARS parity bit. However, the actual characters identified within the text payload 202 may not use every possible value 502. Accordingly, based on the subset of possible character values 502 identified within the text payload 202, a radix base R may be identified (where R is an integer less than 128) corresponding to an alphabet of R radix characters. In embodiments, the ACARS system 100 may execute a simple radix compression of the text payload 202 (e.g., where R=128) by removing the parity bit from each character, mapping each 8-bit character to a 7-bit character and compressing the text payload to 87.5 percent of its original size.

In embodiments, based on the specific character values 502 identified within the text payload 202, the ACARS system 100 may compress the text payload to a greater degree by mapping each component character of the text payload (or group of component characters) to a single binary radix character of an alphabet of R radix characters, where R is an integer less than 128 and not a power of 2. For example, if every identified character of the text payload 202 is found within the radix base 96 alphabet 504, the radix base 96 (e.g., R=96) may be selected.

In embodiments, for each group of N ASCII characters from the text payload 202 (where N is associated with an optimal mapping of ASCII characters to binary radix-R characters), each ASCII character may be converted into a binary radix-R character. For example, when R=96, for each group of N=5 ASCII characters of the text payload 202, the first radix-96 character may be multiplied by $R^2$ $(=96^2)$ and added to the second radix-96 character, which in turn may be multiplied by $96^2$ and added to the third radix-96 character, proceeding until the fifth and last radix-96 character is added, ultimately mapping the 5 ASCII characters (=40 bits) into a 33-bit radix-96 binary value (equivalent to a 17.5% compression rate).

In embodiments, when the end of the text payload 202 is reached and fewer than N ASCII characters remain, each character of the remaining <N ASCII characters (e.g., <5 ASCII characters for radix-96) may be converted to binary radix-R characters, multiplied by R, and added to the subsequent ASCII character, resulting in a final radix-R binary value that uses fewer bits to transmit over the air.

In embodiments, other radix bases corresponding to predetermined binary radix-R alphabets may be selected by the ACARS system 100 based on the ASCII characters identified within the text payload 202. For example, the radix-45 alphabet 506 may be used with a selected radix base R=45, mapping each two ASCII characters of the text payload 202 into 11-bit binary radix-45 characters (~31.3% compression). Similarly, the radix-40 alphabet 508 may be used with a selected radix base R=40, mapping each three ASCII characters of the text payload 202 into 16-bit binary radix-40 characters (~33.3% compression).

Referring back to FIG. 3, in embodiments the compressed message block 206 may be assembled from the compressed text payload 202*a* and the compressed header 204*a* for transmission to the ground station 104. In some embodiments, the compressed message block 206 may include either the compressed text payload 202*a* or the compressed header 204*a*, but not both. For example, if the transceiver (106, FIG. 1) has generated a compressed text payload 202*a* via dynamic radix base-R compression of the text payload 202 as described above, the link layer header 210 may be attached to the compressed message block 206 indicating the radix base R used for text payload compression as well as the length of the compressed message.

In embodiments, when the ground station 104 (or, e.g., transceiver 206, for uplink messages) receives the compressed message block 206 (and, e.g., determines that the compressed message is not a compressed ACK (400*a*, FIG. 4), which may be decompressed by the ground station into the original ACK (400, FIG. 4)), the compressed header 204*a* may be decompressed and the radix base R determined from the link layer header 210. The ground station 104 may decode the compressed text payload 202*a* by deconverting binary radix-R character values into the corresponding ASCII characters or groups of N ASCII characters comprising the original text payload 202 (e.g., reversing the process described above with respect to FIG. 5 and the generation of the compressed text payload 202a). For example, if R=40, for each 16-bit binary radix-40 characters the first radix-40 number may be determined by taking the integer value found by dividing the 16-bit radix-40 binary character by $40^2$. The second radix-40 number may then be found by taking the integer value found by dividing the modulo (e.g., 16-bit binary character/$40^2$) by 40. The resulting radix-40 numbers may then be decoded back into the corresponding three ASCII characters. When the end of the compressed text payload 202a is reached and fewer binary bits remain than is required to accommodate N radix numbers, the appropriate deconversion may be performed for <N radix numbers. The resulting ACARS text message 110 (comprising, e.g., the decompressed ACARS header/trailer component 204 and/or text payload 202) may be output (and/or stored to memory) by the ground station 104.

Referring to FIGS. 6A and 6B, the method 600 may be implemented by the ACARS system 100 and may include the following steps.

At a step 602, the transceiver receives an outbound ACARS message from an end system of the ACARS source (e.g., an aircraft end system). For example, the outbound ACARS message may include a text payload and header/trailer (H/T) components, e.g., a header preceding the text payload and a trailer following the text payload.

At a step 604 the transceiver determines whether the outbound ACARS message is an ACARS block or an ACARS acknowledgement (ACK; e.g., general response). For example, the ACARS block may include a header, text payload, and trailer; the ACARS ACK may include H/T components but may or may not include a text payload.

At a step 606, the transceiver compresses the H/T components by removing fixed marker fields from the header and trailer and compressing variable fields via binary encoding. For example, the address field corresponding to the ACARS source aircraft may be mapped to a radio address of the transceiver. In some embodiments, the 56-bit address field may be radix base 38-compressed to a 37-bit identifier. For example, the H/T component may be compressed whether the ACARS message is a text message or an ACK.

At a step 608, the transceiver compresses the text payload by parsing the text payload to determine the distribution of ASCII characters and selecting a radix base R (R 128) corresponding to a compressed radix-R binary character set. The transceiver maps the component ASCII characters to the corresponding set of binary characters for the selected radix base R. For example, the radix base R may be 128 (e.g., dropping the parity bit from each ASCII character), 96, 45, 40, or some other integer.

At a step 610, the transceiver assembles a compressed message block (e.g., ARINC 618 block, compressed text message, compressed ACK) based on the compressed text payload and compressed H/T components, adding a link layer header indicating to the receiving ACARS source the selected radix base R used for compressing the text payload as well as the length of the compressed ACARS message. In some embodiments, the compressed ACARS message may be compressed into more than one message block, e.g., depending on the size of the text payload.

The method 600 may include an additional step 612. At the step 612, the transceiver transmits the compressed message block (or blocks) to a proximate ground station (or other ACARS destination) based on the appropriate datalink protocol.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. An Aircraft Communication and Addressing Reporting System (ACARS) compatible transmitter, comprising:
   a compressor module communicatively coupled with one or more end systems of an ACARS source, the compressor module configured to:
      receive at least one outbound ACARS compatible message from the one or more end systems, the outbound ACARS compatible message configured for transmission to one or more ACARS destinations according to at least one datalink protocol and including one or more of a header/trailer (H/T) component and a text payload comprising a plurality of component characters;
      determine if the outbound ACARS compatible message is an acknowledgement (ACK) or an ACARS block;
      generate at least one compressed text payload via:
      1) selecting a radix base R by analyzing the component characters of the text payload, where R is an integer; and
      2) mapping the plurality of component characters to an alphabet of R compressed characters;
      if the outbound ACARS compatible message is the ACK, generate at least one compressed ACK based on one or more of 1) removal of one or more fixed markers of the ACK, 2) binary encoding of one or more variable fields of the ACK, and 3) the compressed text payload;
      and
      if the outbound ACARS compatible message is the ACARS block including the H/T component and the text payload:
      generate at least one compressed H/T component via 1) removal of one or more fixed markers of the H/T component and 2) binary encoding of one or more variable fields of the H/T component;
      and
      assemble at least one compressed message block based on the compressed H/T component, the compressed text payload, and a link layer header corresponding to the selected radix base R;
   and
   at least one ACARS compatible transceiver configured to transmit at least one of the compressed message block and the compressed ACK to the one or more ACARS destinations according to the datalink protocol.

2. The ACARS compatible transmitter of claim 1, wherein the one or more fixed markers include an address field corresponding to the ACARS source and generating the compressed H/T component includes one of:
mapping the address field to a radio address associated with the ACARS compatible transceiver;
and
performing a radix base S compression of the address field, where S is an integer.

3. The ACARS compatible transmitter of claim 1, wherein the radix base R is 128.

4. The ACARS compatible transmitter of claim 1, wherein the radix base R is 40.

5. The ACARS compatible transmitter of claim 1, wherein the radix base R is 45.

6. The ACARS compatible transmitter of claim 1, wherein the radix base R is 96.

7. An Aircraft Communication and Addressing Reporting System (ACARS) compatible transmitter, comprising:
a compressor module communicatively coupled with one or more end systems of an ACARS source, the compressor module configured to:
receive at least one outbound ACARS compatible message from the one or more end systems, the outbound ACARS compatible message configured for transmission to one or more ACARS destinations according to at least one datalink protocol and including one or more of a header/trailer (H/T) component and a text payload comprising a plurality of component characters;
determine if the ACARS compatible message is an acknowledgement (ACK) or an ACARS block;
if the ACARS compatible message is an ACARS block:
generate at least one compressed H/T component via 1) removal of one or more fixed markers of the H/T component and 2) binary encoding of one or more variable fields of the H/T component;
generate at least one compressed text payload via:
1) Selecting a radix base R by analyzing the component characters of the text payload, where R is an integer;
and
2) mapping the plurality of component characters to an alphabet of R compressed characters;
and
assemble at least one compressed message block based on the compressed H/T component, the compressed text payload, and a link layer header corresponding to the selected radix base R;
and
at least one ACARS compatible transceiver configured to transmit the compressed message block to the one or more ACARS destinations according to the datalink protocol.

8. The ACARS compatible transmitter of claim 7, wherein the radix base R is 128.

9. The ACARS compatible transmitter of claim 7, wherein the radix base R is 40.

10. The ACARS compatible transmitter of claim 7, wherein the radix base R is 45.

11. The ACARS compatible transmitter of claim 7, wherein the radix base R is 96.

12. The ACARS compatible transmitter of claim 7, wherein, if the ACARS compatible message is an ACK:
the compressor module is configured to generate at least one compressed ACK via one or more of:
1) Removal of one or more fixed markers of the ACK;
2) Binary encoding of one or more variable fields of the ACK;
and
3) generating at least one compressed text payload via
a) selecting a radix base R by analyzing the component characters of the text payload, where R is an integer; and b) mapping the plurality of component characters to an alphabet of R compressed characters;
and
the transceiver is configured to transmit the compressed ACK to the one or more ACARS destinations according to the datalink protocol.

13. The ACARS compatible transmitter of claim 7, wherein the one or more fixed markers include an address field corresponding to the ACARS source and generating the compressed H/T component includes one of:
mapping the address field to a radio address associated with the ACARS compatible transceiver;
and
performing a radix base S compression of the address field, where S is an integer.

14. A method for dynamic compression of Aircraft Communication and Addressing Reporting System (ACARS) compatible messages, comprising:
receiving at least one outbound ACARS compatible message from an end system of an ACARS source, the outbound ACARS compatible message including one or more of a header/trailer (H/T) component and a text payload comprising a plurality of component characters;
determining if the ACARS compatible message is an acknowledgement (ACK) or an ACARS block;
generating at least one compressed H/T component based on the H/T component by
1) Removing one or more fixed markers of the H/T component;
and
2) encoding one or more variable fields of the H/T component;
generating at least one compressed text payload based on the text payload by:
1) Selecting a radix base R by analyzing the component characters of the text payload, where R is an integer;
and
2) mapping the plurality of component characters to an alphabet of R compressed characters;
and
assembling a compressed message block based on the at least one compressed H/T component, the compressed text payload, and a link layer header corresponding to the radix base R.

15. The method of claim 14, wherein the radix base R is selected from the group including 128, 40, 45, or 96.

* * * * *